US012460618B2

United States Patent
Pedersen et al.

(10) Patent No.: US 12,460,618 B2
(45) Date of Patent: Nov. 4, 2025

(54) WIND TURBINE YAWING SYSTEM WITH MULTIPLE MECHANICAL BRAKING LEVELS

(71) Applicant: VESTAS WIND SYSTEMS A/S, Aarhus N (DK)

(72) Inventors: Niels Henrik Pedersen, Aarhus (DK); Jens-Kristian Egsgaard Langkjær, Aarhus (DK); Julio Xavier Vianna Neto, Skødstrup (DK); Søren Dalsgaard, Hadsten (DK); Jesper Lykkegaard Neubauer, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/723,546

(22) PCT Filed: Dec. 22, 2022

(86) PCT No.: PCT/DK2022/050307
§ 371 (c)(1),
(2) Date: Jun. 24, 2024

(87) PCT Pub. No.: WO2023/117025
PCT Pub. Date: Jun. 29, 2023

(65) Prior Publication Data
US 2025/0059948 A1    Feb. 20, 2025

(30) Foreign Application Priority Data
Dec. 23, 2021  (DK) .............................. PA202170664

(51) Int. Cl.
*F03D 7/02*       (2006.01)
(52) U.S. Cl.
CPC ......... *F03D 7/0204* (2013.01); *F03D 7/0248* (2013.01); *F05B 2260/902* (2013.01)

(58) Field of Classification Search
CPC ...... F03D 11/02; F03D 7/0204; F03D 7/0248; F03D 7/0224; F05B 2260/902;
(Continued)

(56) References Cited

U.S. PATENT DOCUMENTS 10,598,148 B2 *  3/2020  Wilmot ................... F03D 7/042
2008/0131279 A1   6/2008  Behnke et al.
(Continued)

FOREIGN PATENT DOCUMENTS

EP      3594492 A1    1/2020
JP   2011127551 A    6/2011
(Continued)

OTHER PUBLICATIONS

Danish Patent and Trademark Office, 1st Technical Examination including The Search Report and Opinion for Application PA 2021 70664 dated Jun. 27, 2022.
(Continued)

*Primary Examiner* — Courtney D Heinle
*Assistant Examiner* — Ryan C Clark
(74) *Attorney, Agent, or Firm* — Patterson + Sheridan, LLP; Gero G. McClellan

(57) ABSTRACT

Systems, methods, and computer program products for controlling a yaw system of a wind turbine. The yaw system includes mechanical brakes that provide a first amount of braking torque when closed. The yaw system is configured to transition from a yawing state to a parked by brake state by closing mechanical brakes in a first subset of the mechanical brakes and opening each mechanical brake in a second subset of the mechanical brakes. The second subset provides a second amount of braking torque that is less than the first amount of braking torque. In response to detecting a rotation of the nacelle while in the parked by brake state, the yaw system is configured to transition from the parked (Continued)

by brake state to a parked by motor state in which yaw drives are activated to provide a counter acting torque in opposition to the detected rotation of the nacelle.

16 Claims, 8 Drawing Sheets

(58) Field of Classification Search
CPC ........ F05B 2270/902; F05B 2270/1077; F05B 2270/1047; F05B 2270/107; F05B 2270/109; F05B 2270/1095
See application file for complete search history.

(56) References Cited

U.S. PATENT DOCUMENTS

| | | | |
|---|---|---|---|
| 2010/0109327 A1* | 5/2010 | Nielsen | F03D 7/0204 290/44 |
| 2011/0171022 A1* | 7/2011 | Behnke | F03D 80/00 416/9 |
| 2011/0211961 A1 | 9/2011 | Nies et al. | |
| 2013/0088009 A1 | 4/2013 | Cousineau et al. | |
| 2013/0170989 A1* | 7/2013 | Trede | F03D 7/0244 416/9 |
| 2014/0331797 A1* | 11/2014 | Rasmusen | F16H 19/02 74/25 |
| 2015/0275858 A1* | 10/2015 | Frederiksen | F03D 7/0204 415/4.5 |

FOREIGN PATENT DOCUMENTS

| | | | | |
|---|---|---|---|---|
| WO | WO-2018091144 A1 * | 5/2018 | | F03D 17/00 |
| WO | 2021213602 A1 | 10/2021 | | |

OTHER PUBLICATIONS

PCT International Search Report and Written Opinion of The International Searching Authority for Application PCT/DK2022/050307 dated Apr. 18, 2023 (Apr. 18, 2023).

* cited by examiner

WIND TURBINE YAWING SYSTEM WITH MULTIPLE MECHANICAL BRAKING LEVELS

TECHNICAL FIELD

This invention relates generally to wind turbines, and more particularly to systems, methods, and computer program products for controlling a yaw system in a wind turbine.

BACKGROUND

Wind turbines produce electrical energy by converting the kinetic energy of wind into mechanical energy that is used to drive a generator. A horizontal-axis wind turbine typically includes a tower, a nacelle located at the apex of the tower, and a rotor that is supported by the nacelle. The rotor includes one or more blades that capture the energy of the wind, and is coupled to the generator for converting the captured wind energy into electrical energy. For a horizontal axis wind turbine to function efficiently, the nacelle must be properly oriented with respect to the wind. Thus, large wind turbines typically include a yaw system that rotates the nacelle about a generally vertical axis to control the direction in which the nacelle is oriented.

Yaw systems include motors that move the nacelle and brakes which add friction to the movement of the nacelle to keep the nacelle from rotating once it has been orientated by the motors. A nacelle that is being held in a fixed orientation is commonly referred to as being parked. Because yaw control systems are normally designed to avoid frequent changes in orientation due to minor or temporary shifts in the wind, yaw systems typically spend most of their time in a parked state. If the moment of the nacelle about its axis of rotation exceeds the mechanical brakes' ability to prevent the nacelle from rotating while in the parked state, the nacelle may experience unwanted movement, referred to as sliding. If sliding occurs, the yaw system may be able to reposition the nacelle by activating the motors so long as power is available. However, because power may be lost under extreme conditions, yaw systems are typically designed with mechanical brakes that provide enough braking friction to prevent sliding under a defined set of non-operational conditions, e.g., 50-year storm conditions without available grid power.

As the size of modern wind turbine systems has increased, the forces acting on the wind turbine while parked have also increased. Accordingly, yaw system braking arrangements must evolve to handle these increased loads. Hence, there is a need for improved systems, methods, and computer program products for yawing nacelles of wind turbines.

SUMMARY OF INVENTION

In one aspect of the invention, a system for controlling a wind turbine that includes a tower and a nacelle is provided. The system includes a yaw drive configured to selectively apply torque between the tower and the nacelle, a plurality of mechanical brakes that, when each of the mechanical brakes is in a closed state, provides a first amount of braking torque between the tower and the nacelle, one or more processors operatively coupled to the at least one yaw drive and the plurality of mechanical brakes, and a memory coupled to the one or more processors. The memory includes program code that, when executed by the one or more processors, causes the system to, under operational conditions, activate the yaw drive in a yawing state to rotate the nacelle to a first orientation relative to the tower. In response to the nacelle reaching the first orientation, the program code further causes the system to transition from the yawing state to a parked by brake state in which the yaw drive is inactive, each mechanical brake of a first subset of the plurality of mechanical brakes is in an open state, and each mechanical brake of a second subset of the plurality of mechanical brakes is in the closed state, wherein the second subset of the plurality mechanical brakes provides a second amount of braking torque between the tower and the nacelle that is less than the first amount of braking torque. In response to detecting a rotation of the nacelle while in the parked by brake state, the program code causes the system to transition from the parked by brake state to a parked by motor state in which the yaw drive is activated to provide a counter acting torque in opposition to the detected rotation of the nacelle.

In one embodiment of the invention, the program code may further cause the system to detect an amount of the counter acting torque being provided in opposition to the detected rotation of the nacelle while in the parked by motor state, and in response to the counter acting torque dropping below a first torque threshold that is below the second amount of braking torque, transition from the parked by motor state to the parked by brake state.

In another embodiment of the invention, the program code may further cause the system to determine a number of times it has transitioned between the parked by brake state and the parked by motor state during a period of time. In response to the number of times being above a first transition frequency threshold, the program code may cause the system to decrease the first torque threshold. In response to the number of times being below a second transition frequency threshold that is less than the first transition frequency threshold, the program code may cause the system to increase the first torque threshold.

In another embodiment of the invention, the program code may further cause the system to determine the number of times it has transitioned between the parked by brake state and the parked by motor state during the period of time. In response to the number of times being above the first transition frequency threshold, the program code may cause the system to increase the number of mechanical brakes in the second subset of the plurality of mechanical brakes. In response to the number of times being below the second transition frequency threshold, the program code may cause the system to decrease the number of mechanical brakes in the second subset of the plurality of mechanical brakes.

In another embodiment of the invention, the program code may further cause the system to select which mechanical brakes are included in the second subset of the plurality of mechanical brakes based on a number of times each mechanical brake has transitioned between the open state and the closed state. For example, the mechanical brakes selected may be those having the lowest number of transitions.

In another embodiment of the invention, the program code may further cause the system to, in response to being under non-operational conditions, cause each of the plurality of mechanical brakes to enter the closed state so the plurality of mechanical brakes provides the first amount of braking torque between the tower and the nacelle.

In another embodiment of the invention, the non-operational conditions may include one or more of a wind speed exceeding a cut-out speed, a loss of grid power, and a system fault.

In another embodiment of the invention, each mechanical brake of the plurality of mechanical brakes may be configured to be normally closed.

In another embodiment of the invention, the program code may further cause the system to, in response to the yaw drive being activated to provide the counter acting torque in opposition to the detected rotation of the nacelle, open each mechanical brake of the second subset of the plurality of mechanical brakes. The rotation of the nacelle may be detected, for example, based on detected rotation of the drive gear.

In another embodiment of the invention, the counter acting torque in opposition to the detected rotation of the nacelle may be provided at a first level that maintains the nacelle in the first orientation while the nacelle moment is below a second torque threshold, and may be provided at a second level that allows the nacelle to slide in a controlled manner when the nacelle moment is above the second torque threshold, wherein the second torque threshold is above the second amount of braking torque.

In another aspect of the invention, a method of controlling the wind turbine is provided. The method includes, while the wind turbine is in the yawing state, activating the yaw drive to rotate the nacelle to the first orientation relative to the tower. In response to the nacelle reaching the first orientation, the method transitions the wind turbine from the yawing state to the parked by brake state in which the yaw drive is inactive, each mechanical brake of the first subset of the plurality of mechanical brakes is in the open state, and each mechanical brake of the second subset of the plurality of mechanical brakes is in the closed state. The first amount of braking torque is provided between the tower and the nacelle when each of the plurality of mechanical brakes is in the closed state, and the second amount of braking torque is provided between the tower and the nacelle when only the second subset of the plurality mechanical brakes is in the closed state. In response to detecting the rotation of the nacelle while in the parked by brake state, the method transitions the wind turbine from the parked by brake state to the parked by motor state in which the yaw drive is activated to provide the counter acting torque in opposition to the detected rotation of the nacelle.

In one embodiment of the invention, the method may further include detecting the amount of counter acting torque being provided in opposition to the detected rotation of the nacelle while in the parked by motor state, and in response to the counter acting torque dropping below the torque threshold that is less than the second amount of braking torque, transitioning from the parked by motor state to the parked by brake state.

In another embodiment of the invention, the method may further include determining the number of times the wind turbine has transitioned between the parked by brake state and the parked by motor state during the period of time, in response to the number of times being above the first transition frequency threshold, decreasing the torque threshold, and in response to the number of times being below the second transition frequency threshold, increasing the torque threshold.

In another embodiment of the invention, the method may further include determining the number of times the wind turbine has transitioned between the parked by brake state and the parked by motor state during the period of time, in response to the number of times being above the first transition frequency threshold, increasing the number of mechanical brakes in the second subset of the plurality of mechanical brakes, and in response to the number of times being below the second transition frequency threshold, decreasing the number of mechanical brakes in the second subset of the plurality of mechanical brakes.

In another aspect of the invention, a computer program product for controlling the wind turbine is provided. The computer program product includes a non-transitory computer-readable storage medium, and program code stored on the non-transitory computer-readable storage medium. The program code is configured so that, when it is executed by one or more processors, the program code causes the one or more processors to, while the wind turbine is in the yawing state, activate the yaw drive to rotate the nacelle to the first orientation relative to the tower. In response to the nacelle reaching the first orientation, the program code causes the one or more processors to transition the wind turbine from the yawing state to the parked by brake state in which the yaw drive is inactive, each mechanical brake of the first subset of the plurality of mechanical brakes is in the open state, and each mechanical brake of the second subset of the plurality of mechanical brakes is in the closed state. The first amount of braking torque is provided between the tower and the nacelle when each of the plurality of mechanical brakes is in the closed state, and the second amount of braking torque is provided between the tower and the nacelle when only the second subset of the plurality mechanical brakes is in the closed state. In response to detecting the rotation of the nacelle while in the parked by brake state, the program code causes the one or more processors to transition the wind turbine from the parked by brake state to the parked by motor state in which the yaw drive is activated to provide the counter acting torque in opposition to the detected rotation of the nacelle.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Figure 1:
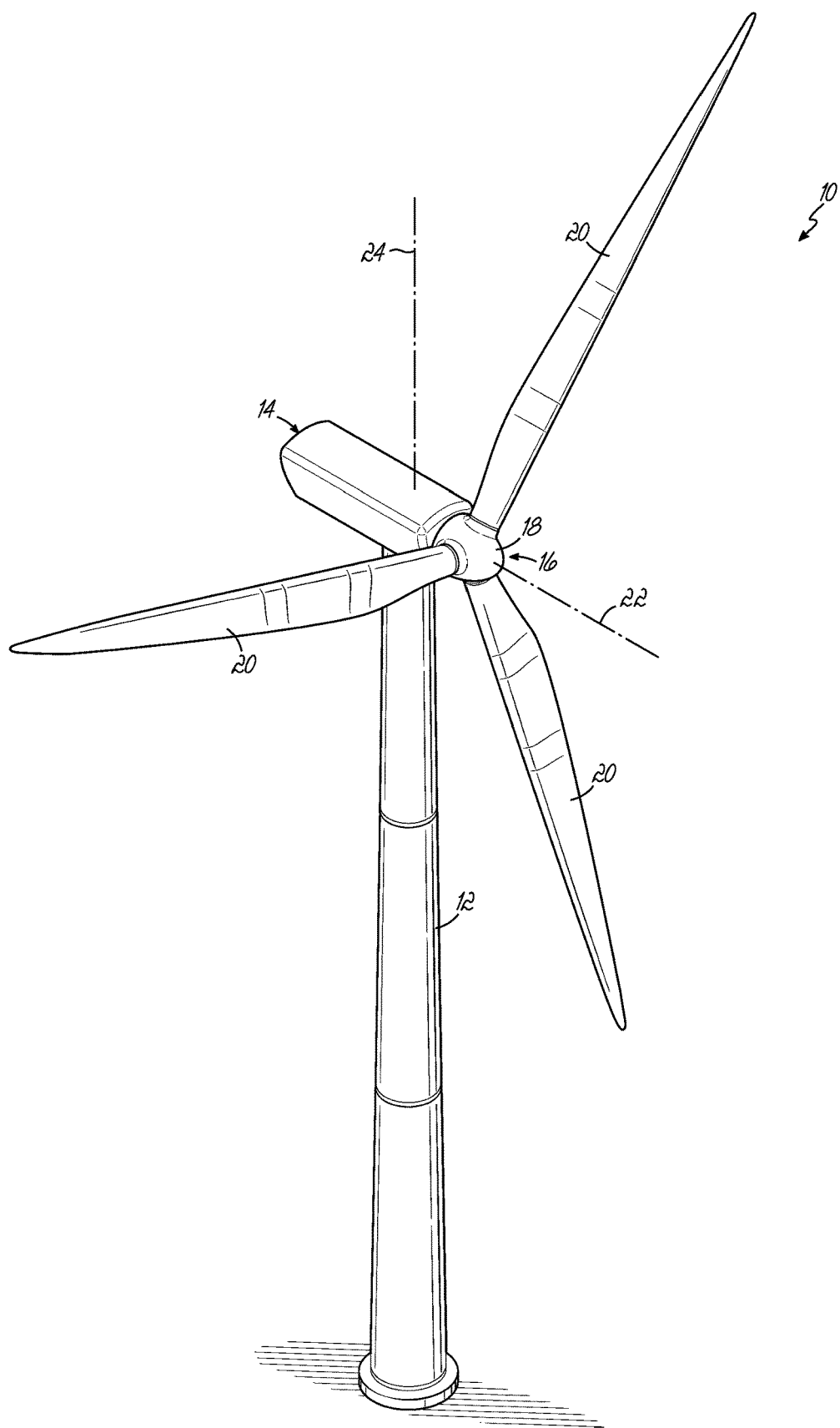
FIG. 1 is a perspective view of an exemplary wind turbine in accordance with an embodiment of the invention.

It should be understood that the appended drawings are not necessarily to scale, and may present a somewhat simplified representation of various features illustrative of the basic principles of the invention. The specific design features of the sequence of operations as disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding.

DETAILED DESCRIPTION

Aspects of the invention include yaw systems for a wind turbine, as well as methods and computer program products for controlling the yaw systems. The yaw systems include mechanical brakes and motors configured to rotate a nacelle relative to a tower of the wind turbine, and transition between yawing, parked by brake, and parked by motor states to control the orientation of the nacelle.

A mechanical brake is a brake that selectively provides braking friction between the nacelle and tower of the wind turbine. The total friction in the yaw system at any given time includes the braking friction generated by the mechanical brakes plus any inherent friction generated by the bearings and other components of the yaw system. Braking friction may be provided by pressing a friction pad operatively coupled to one of the tower or the nacelle against a friction surface operatively coupled to the other of the tower or nacelle. Braking friction provides a braking torque that resists relative rotation between the nacelle and the tower, and that is equal to the braking friction times the torque moment of the mechanical brake providing the braking friction.

Mechanical brakes are described as applied or "closed" when the friction pad is being pressed against the friction surface, and released or "open" when the friction pad is not being pressed against the friction surface. A "normally open" mechanical brake is closed when activated and open when not activated. A "normally closed" mechanical brake is open when activated and closed when not activated. In the event of a system failure (e.g., loss of power), a normally open mechanical brake enters an open state, and a normally closed mechanical brake enters a closed state.

The motors of the yaw system may be used to provide torque in opposition to the moment of the nacelle, referred to as counter acting torque. In yaw systems having electric motors, counter acting torque may be selectively controlled by the controller adjusting the amount of power provided to the electric motors. Movement by the nacelle while under braking may be referred to as sliding. Sliding may occur during braking when the moment of the nacelle exceeds the total resistance to rotation provided by the yaw system. That is, when the nacelle moment exceeds the combination of counter acting torque, braking torque, and torque due to inherent friction, referred to as friction torque.

Operational states of the yaw systems described herein include yawing, parked by brake, and parked by motor states. In the yawing state, the yaw system may activate one or more yaw drives to rotate the nacelle, e.g., to reorient the nacelle so that it is pointing into the wind. While in the yawing state, the mechanical brakes may be placed in an open state to reduce the resistance of the nacelle to movement by the motors. The speed and direction in which the nacelle is rotated while in the yawing state may be controlled by a yaw controller based on received signals indicative of an orientation of the nacelle, a direction of the wind, the amount of torque being applied by the motors, or any other relevant operational parameter. Once the nacelle is oriented in the desired direction (e.g., into the wind), the yaw system may enter a parked state. While in the parked state, the yaw system may hold the nacelle in position with braking torque (parked by brakes), counter acting torque (parked by motor), or a combination thereof.

The yaw system may be configured to transition from the parked by brake state to the parked by motor state in response to the moment of the nacelle exceeding a parked by brake torque threshold. To detect that the parked by brake torque threshold has been exceeded, the yaw system may control the mechanical brakes in a manner that allows sliding in response to the moment of the nacelle exceeding the parked by brake torque threshold. If the mechanical brakes are unable to hold the nacelle in a fixed orientation while in the parked by brake state, the yaw system may detect rotation of the nacelle and transition to the parked by motor state in response. The yaw system may then allow controlled sliding in the parked by motor state, e.g., by providing a counter acting torque that, in combination with the friction torque, is equal to or less than the nacelle moment. Controlled sliding may be used, for example, to reduce the loads placed on wind turbine components by extreme operational conditions. When transitioning from the parked by brake state to either of the parked by motor or yawing states, one or more of the motors may be activated prior to opening the mechanical brakes to avoid an unwanted or sudden movement of the nacelle.

Sliding while one or more mechanical brakes are in a closed state may be used to determine when to shift the yaw system from one state (e.g., the parked by brake state) to another state (e.g., the parked by motor state). To allow slippage during normal operation of the wind turbine, the combination of braking torque and friction torque needs to be lower than the nacelle moment at which controlled sliding through active motor braking is desired. At the same time, it may be desirable to have braking torque high enough to prevent unintended sliding under non-operational conditions when power to the yaw system could be lost. Non-operational conditions may include any condition under which it is desirable to shut down the wind turbine, such as one or more of storm conditions, a grid outage, or a fault in the yaw system. Mechanical braking systems that provide the same braking torque regardless of the load scenario are unable to satisfy the above criteria when non-operational conditions require higher braking torque than operational conditions. Embodiments of the present invention solve this problem by configuring the yaw system so that it can vary the amount of braking torque that is available based on conditions at the wind turbine.

FIG. 1 illustrates an exemplary wind turbine 10 in accordance with an embodiment of the invention. The wind turbine 10 includes a tower 12 extending upward from a foundation, a nacelle 14 disposed at the apex of the tower 12, and a rotor 16 operatively coupled to a generator in the nacelle 14. In addition to the generator, the nacelle 14 typically houses various components needed to convert wind energy into electrical energy and needed to operate and optimize the performance of the wind turbine 10. The tower 12 supports the load presented by the nacelle 14, rotor 16, and other wind turbine components housed inside the nacelle 14. The tower 12 of wind turbine 10 elevates the nacelle 14 and rotor 16 to a height above ground level that allows the rotor 16 to spin freely and at which air currents having lower turbulence and higher velocity are often found.

The rotor 16 includes a hub 18 and one or more (e.g., three) blades 20 attached to the hub 18 at locations distributed about its circumference. The blades 20 project radially outward from the hub 18, and are configured to interact with passing air currents to produce rotational forces that cause the hub 18 to spin about a longitudinal axis 22. This rotational energy can then be delivered to the generator housed within the nacelle 14 and converted into electrical power. To optimize performance of the wind turbine 10, the nacelle 14 may be rotated about a generally vertical axis of rotation 24 by a yaw system and the pitch of blades 20 may be adjusted by a pitch system in response to wind speed and other operational conditions.

Figure 2:
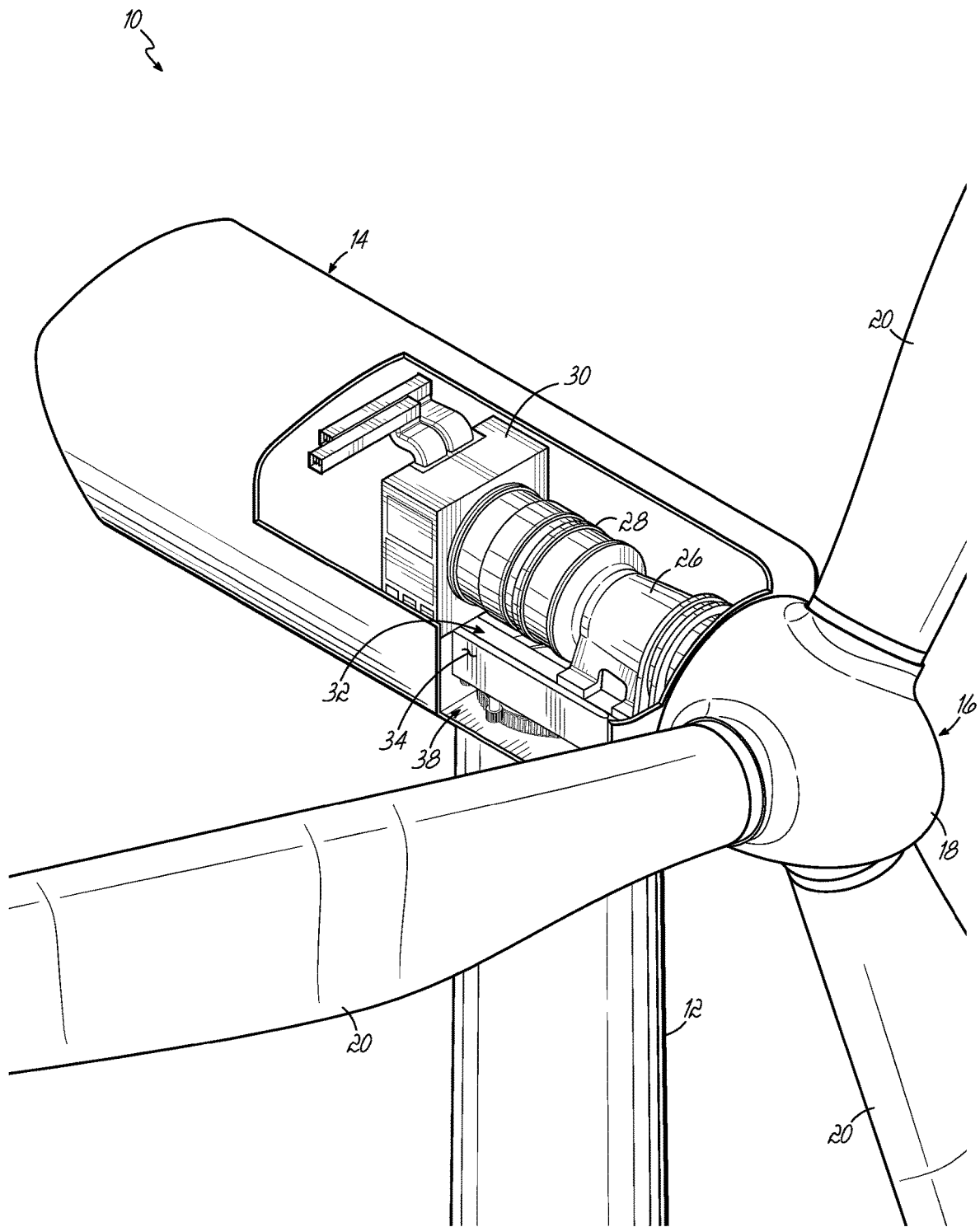
FIG. 2 is a perspective view of a portion of the wind turbine of FIG. 1 in which the nacelle is partially broken away to expose structures housed inside the nacelle.

FIG. 2 presents a perspective view in which the nacelle 14 is partially broken away to expose structures housed inside. A main shaft extending from the rotor 16 into the nacelle 14 may be held in place by a main bearing support 26 which supports the weight of the rotor 16 and transfers the loads on the rotor 16 to the tower 12. The main shaft may be operatively coupled to a gearbox 28 that transfers the rotation thereof to a generator 30. The electrical power produced by the generator 30 may be supplied to a power grid (not shown) or an energy storage system (not shown) for later release to the grid as understood by a person having ordinary skill in the art. In this way, the kinetic energy of the wind may be harnessed by the wind turbine 10 for power generation.

The weight of the nacelle 14 including the components housed therein may be carried by a load bearing structure 32. The load bearing structure 32 may include an outer housing of the nacelle 14 and one or more additional structural components such as a framework or lattice, and a gear bell 34. The gear bell 34 may operatively couple the load of the nacelle 14 to the tower 12 through a yaw bearing that allows the nacelle 14 to be rotated relative to the tower 12 by a yaw system 38 that operatively couples the nacelle 14 to the tower 12.

Figure 3:
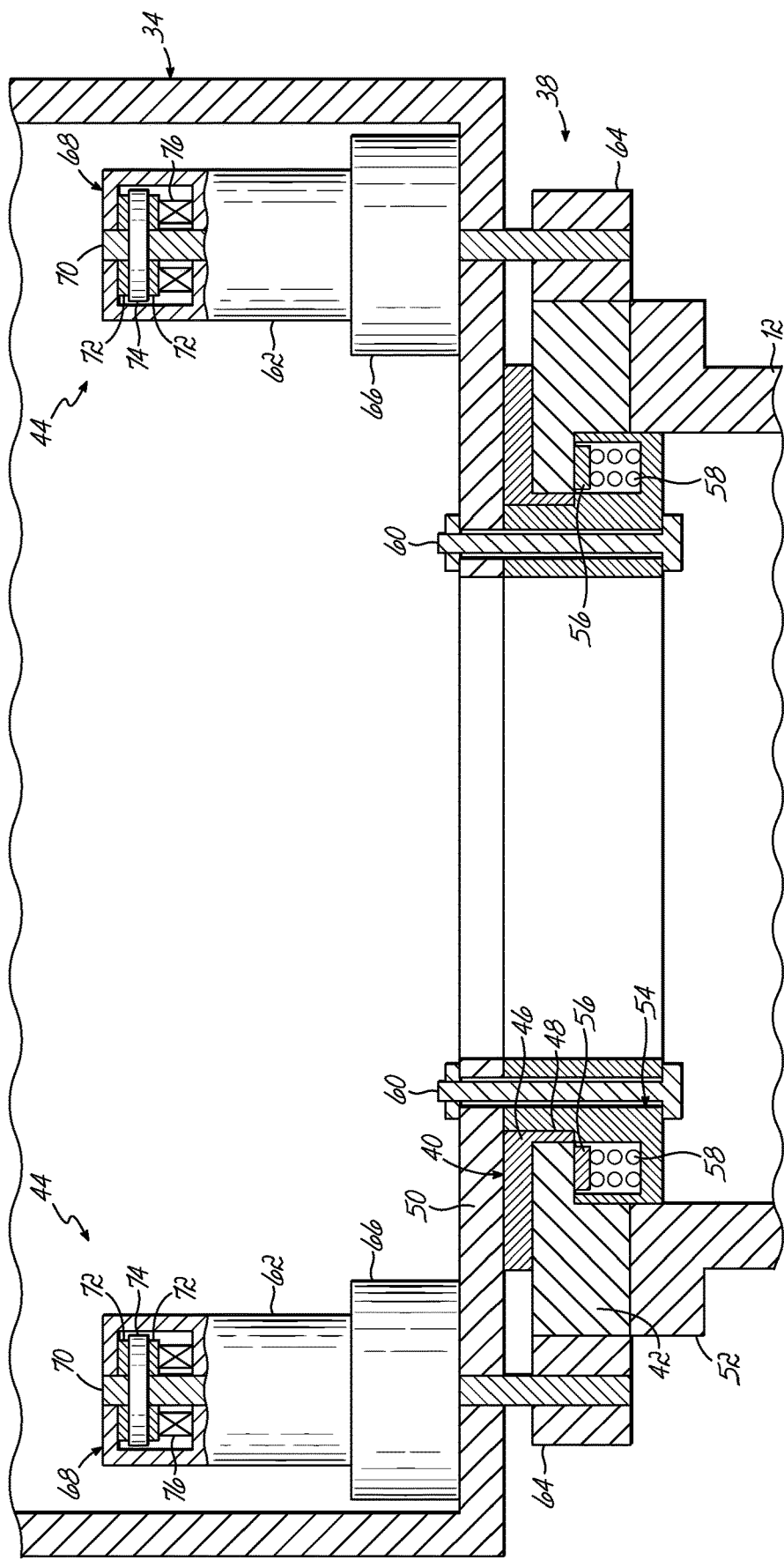
FIG. 3 is a cross-sectional schematic view of a yaw system that may be used to control the wind turbine of FIGS. 1 and 2.

FIG. 3 depicts a cross-sectional view of an exemplary yaw system 38 that includes a yaw bearing 40, a ring gear 42, and one or more yaw drives 44. The yaw bearing 40 may be a sliding bearing that includes an axial bearing element 46 and a radial bearing element 48. The radial bearing element 48 may maintain the nacelle 14 in a concentric relationship with the tower 12. The axial bearing element 46 may operatively couple the load of nacelle 14 from a bedplate 50 of gear bell 34 to the tower 12, e.g., via the ring gear 42. The ring gear 42 may be operatively coupled to a flange 52 of tower 12 by bolts or other suitable fasteners (not shown).

The nacelle 14 may be held in place by gravity and one or more "yaw claws" 54. Each yaw claw 54 may include a friction pad 56 that is urged into engagement with a lower surface of the ring gear 42 by an elastic member 58. Each yaw claw 54 may be operatively coupled to the bedplate 50 by one or more fasteners 60 (e.g., bolts each mated to a corresponding nut) and positioned circumferentially around the ring gear 42. The friction pad 56 of each yaw claw 54 may provide a friction torque that damps out oscillations in the yaw system 38 and that reduces the amount of torque experienced by the yaw drives 44 while operating in a braking mode. This frictional torque may also need to be overcome by the yaw drives 44 when the yaw system 38 is used to actively yaw the nacelle 14.

Each yaw drive 44 may include a motor 62, a pinion gear 64, a gearbox 66 (e.g., a planetary gearbox) that operatively couples the motor 62 to the pinion gear 64, and a mechanical brake 68. Each motor 62 may include an electrical motor (e.g., an asynchronous induction or permanent magnet motor) powered by a variable frequency drive, controllable power supply, or other suitable power source that enables control over the speed or torque provided by the motor 62. In an alternative embodiment, each motor 62 may include a hydraulic or pneumatic motor, in which case the speed or torque may be controlled by varying a pressure or flow rate of a fluid (hydraulic fluid or compressed air) provided to the motor 62. One or more of the motors 62 may also include an encoder configured to detect the speed or angular position of the motor 62. The speed or angular position of the motor 62 may then be used to determine a movement or position of the nacelle 14 relative to the tower 12. In an alternative embodiment, the movement or position of the nacelle 14 relative to the tower 12 may be detected by a yaw position sensor (not shown).

The pinion gear 64 may engage the ring gear 42 so that when the motor 62 is activated, the resulting rotation of the pinion gear 64 causes the nacelle 14 to rotate relative to the tower 12. The mechanical brake 68 may be a normally closed brake that, together with the bearing friction and friction provided by the yaw claws 54, prevents movement of the nacelle 14 when the nacelle 14 is not being actively yawed. The yaw system 38 may further include one or more lubrication systems (not shown) that provide lubrication to the yaw bearing 40 and ring gear 42.

The mechanical brake 68 may be operatively coupled to the motor 62 by a motor shaft 70, and may include one or more brake pads 72, a brake rotor 74, and one or more actuators 76 (e.g., electrical, mechanical, or hydraulic actuators) that selectively urge the brake pads 72 into or out of frictional engagement with the brake rotor 74. The mechanical brake 68 may also include one or more elastic members (e.g., springs) that bias the brake pads 72 into engagement with the brake rotor 74 (normally closed) or out of engagement with the brake rotor 74 (normally open). Because the pinion gear 64 is operatively coupled to the mechanical brake 68 by the gearbox 66 and motor shaft 70, when the brake pads 72 engage the brake rotor 74, the mechanical brake 68 may provide a braking torque that opposes movement of the nacelle 14 relative to the ring gear 42 and tower 12.

In the normally closed configuration, when the actuators 76 are not activated, the elastic members may urge the brake pads 72 into engagement with the brake rotor 74 such that friction between the brake pads 72 and brake rotor 74 resists rotation of the motor shaft 70. In response to being activated, the actuators 76 may generate sufficient force to overcome the elastic members, thereby releasing the mechanical brake 68 and allowing the motor shaft 70 to rotate freely.

Figure 4:
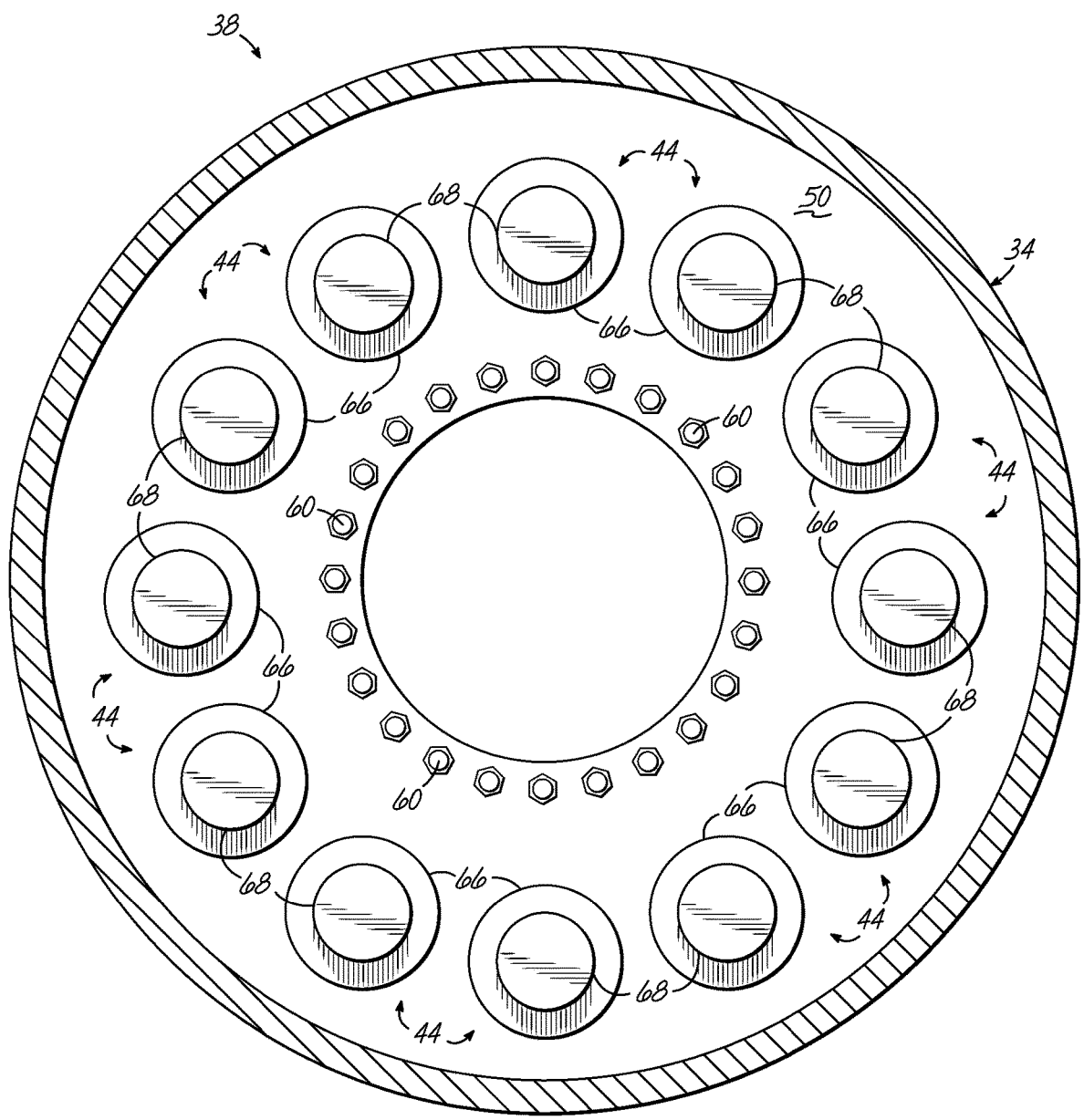
FIG. 4 is top diagrammatic view of the yaw system of FIG. 3.
Figure 5:
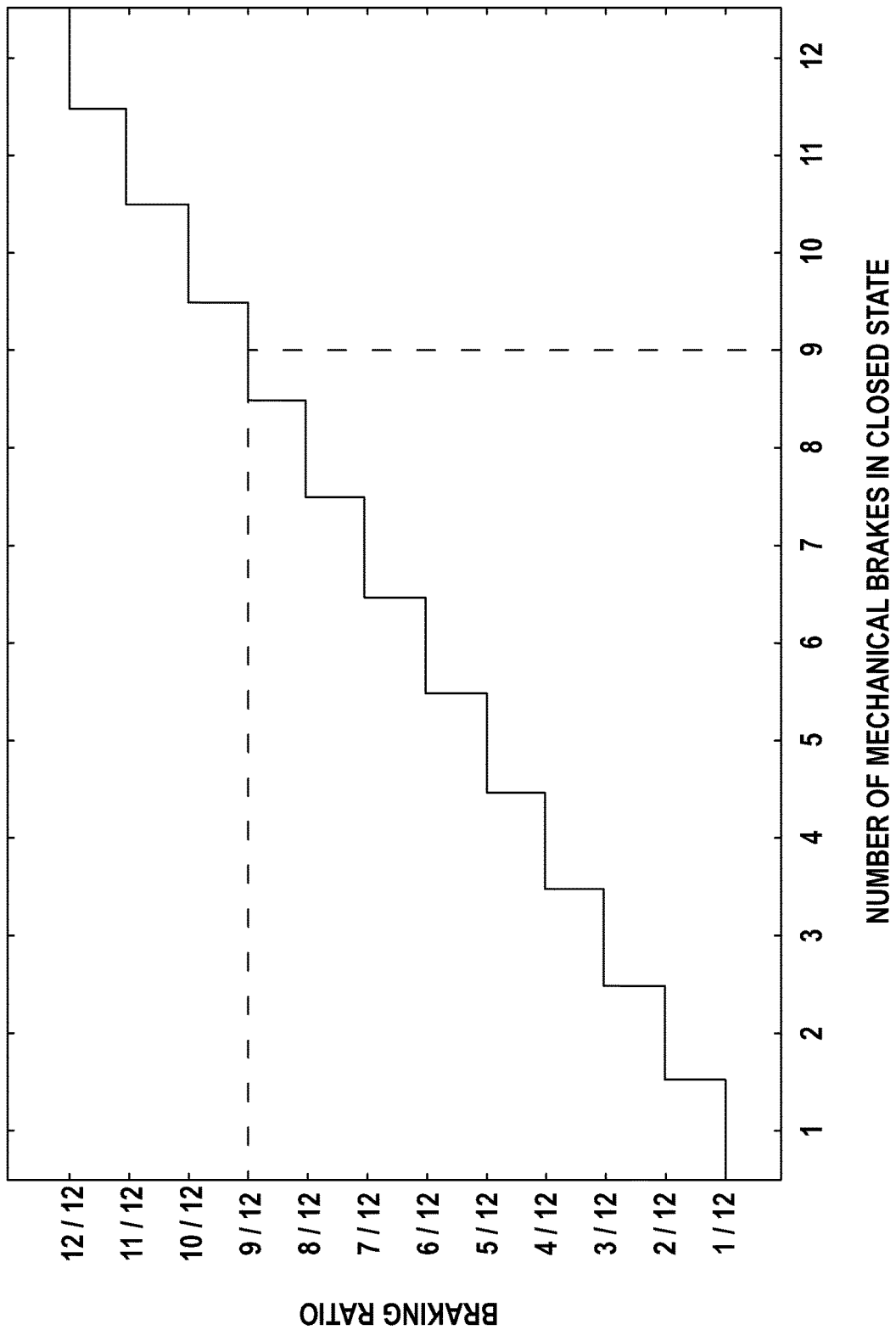
FIG. 5 is a graphical view of exemplary braking ratios verses number of mechanical brakes in a closed state for the yaw system of FIGS. 3 and 4.

FIG. 4 depicts a top view of the exemplary yaw system 38 of FIG. 3 with a plurality of yaw drives (e.g., 12 drives) positioned in a circular arrangement on the bedplate 50. In the depicted embodiment, the amount of braking torque may be provided in discrete steps depending on the number of mechanical brakes 68 actively opened (for normally closed mechanical brakes 68) or actively closed (for normally open mechanical brakes 68). As illustrated by the plot of FIG. 5, braking torque may be provided based on the ratio of closed mechanical brakes to total mechanical brakes. In the exemplified case here, because the yaw system 38 includes twelve yaw drives 44 each with its own mechanical brake 68, the total braking torque during normal operation may be set to a percentage of the maximum available braking torque (e.g., 75%) by maintaining one or more of the mechanical brakes 68 (e.g., 3 of 12 brakes) in an open state. The full braking capacity may then be provided under non-operational conditions by closure of all the mechanical brakes 68.

In general, embodiments of the invention vary the number of mechanical brakes that are in a closed state depending on the operational conditions to obtain multiple (e.g., two) levels of braking torque and thus a corresponding amount of resistance to rotation of the nacelle 14. For example, a relatively low level of total mechanical braking torque may be used under normal operational conditions to facilitate transitions between yawing stages, e.g., to transition between parked by brake, parked by motor, and yawing states. A relatively high level of total mechanical braking torque may be used under non-operational conditions (e.g., when power is unavailable) to prevent unintended yawing.

The yaw system 38 depicted in FIGS. 3 and 4 is for exemplary purposes only, and embodiments of the invention in their broader aspects are not limited to the specific details of the exemplary yaw system 38. For example, the ring gear 42 may have teeth that face radially inward, axially upward, axially downward, or at any other suitable angle rather than radially outward as depicted in FIG. 3. By way of another example, the gearboxes 66 could be configured so that the motor 62 of yaw drive 44 is oriented at angle (e.g., a 90-degree angle) to the gearbox 66. The motors 64 may also be coupled directly to the pinion gear, in which case the gearboxes 66 could be omitted. Further exemplary modifications could include mechanical brakes 68 that are independently coupled to the ring gear 42 rather than integrated with the yaw drive 44. This independent coupling could be through a dedicated gearbox and pinion gear, or through direct contact between the brake pads 72 and a friction surface of the ring gear 42. Additional variations in the yaw system 38 will readily appear to those skilled in the art.

Figure 6:
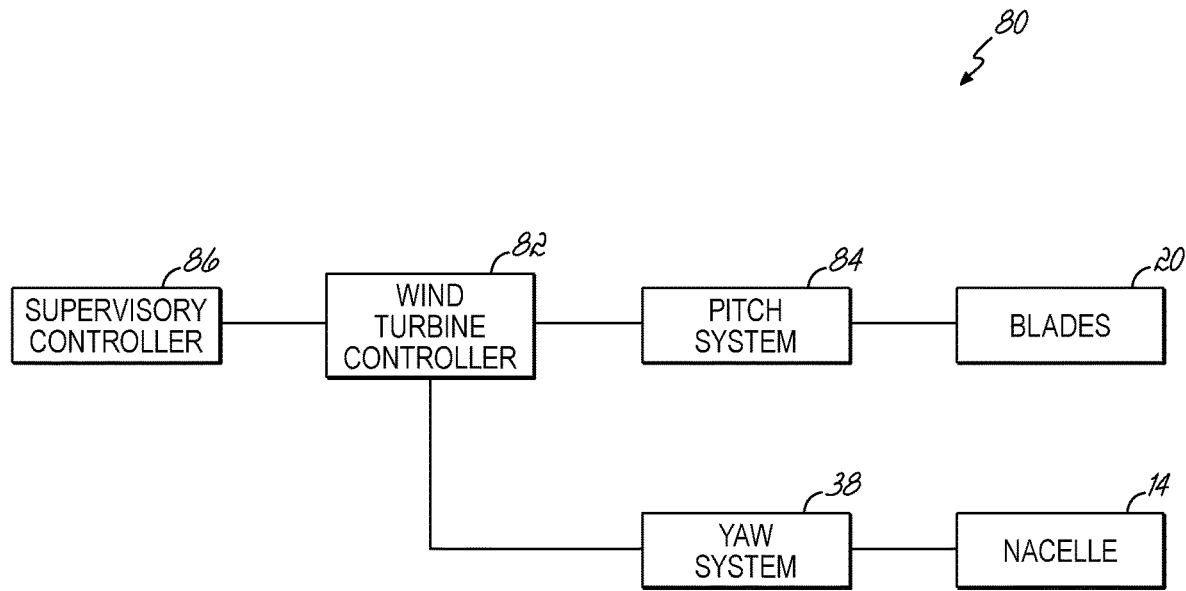
FIG. 6 is a diagrammatic view of a control system that may be used to control the wind turbine of FIGS. 1 and 2 and that includes a yaw system.

FIG. 6 illustrates an exemplary control system 80 that may be used to control the wind turbine 10. The control system 80 includes a wind turbine controller 82 in communication with the yaw system 38, a pitch system 84, and a supervisory controller 86. The supervisory controller 86 may be configured to implement a system-wide control strategy for a group of wind turbines 10 (e.g., a wind farm) that optimizes the collective performance of the wind turbines 10, e.g., to maximize power production of the group. The yaw system 38 may be used by the wind turbine controller 82 to control the direction in which the nacelle 14 is pointed, and may include one or more yaw controllers, drive systems, position sensors, etc. configured to implement a yaw command signal received from the wind turbine controller 82. The pitch system 84 may be configured to adjust the pitch of the blades 20 collectively or independently in response to a pitch command signal received from the wind turbine controller 82.

Under operational conditions (e.g., no system faults and a wind speed below a cut-out wind speed), the wind turbine controller 82 may be configured to monitor the speed of the rotor 16 and adjust the pitch of the blades 20 in response to existing wind conditions in order to control operation of the wind turbine 10. When the wind speed is below a cut-in speed for the wind turbine 10, the wind turbine 10 may be in an idle mode during which rotor 16 is not rotating or slowly rotating. As the wind speed exceeds the cut-in speed, the rotor 16 of wind turbine 10 may begin to rotate, which may allow the wind turbine 10 to begin generating power. As the wind speed further increases from the cut-in speed up to a rated wind speed, the wind turbine controller 82 may be configured to set the blade pitch to maximize the conversion of aerodynamic energy into rotational energy at the generator 30. Once the rated wind speed has been reached, the wind turbine 10 may be generating electricity at its maximum rated output power. From this point on, as the wind speed increases further, the wind turbine controller 82 may adjust the blade pitch to maintain the speed and torque applied to the generator 30 at the rated levels. Finally, when the wind speed reaches the cut-out speed, the wind turbine controller 82 may feather the blades to prevent damage to the wind turbine 10.

A yaw angle γ is the difference between the direction in which the nacelle 14 is oriented and the direction from which the wind is blowing. Under normal operational conditions, the wind turbine controller 82 may continuously or periodically determine the yaw angle γ for the wind turbine 10. If the yaw angle γ exceeds a threshold, the wind turbine controller may cause the yaw system 38 to rotate the nacelle 14 to reduce the yaw angle γ. The wind turbine controller 82 may be generally configured to maintain the yaw angle γ within defined parameters to maximize power production and minimize wind loading of the wind turbine 10. Under non-operational conditions, such as a wind speed above the cut-out speed, loss of grid power, or detection of a system fault, the wind turbine controller 82 may cause the yaw system 38 to brake the nacelle 14 and cause the pitch system 84 to feather the blades 20.

Figure 7:
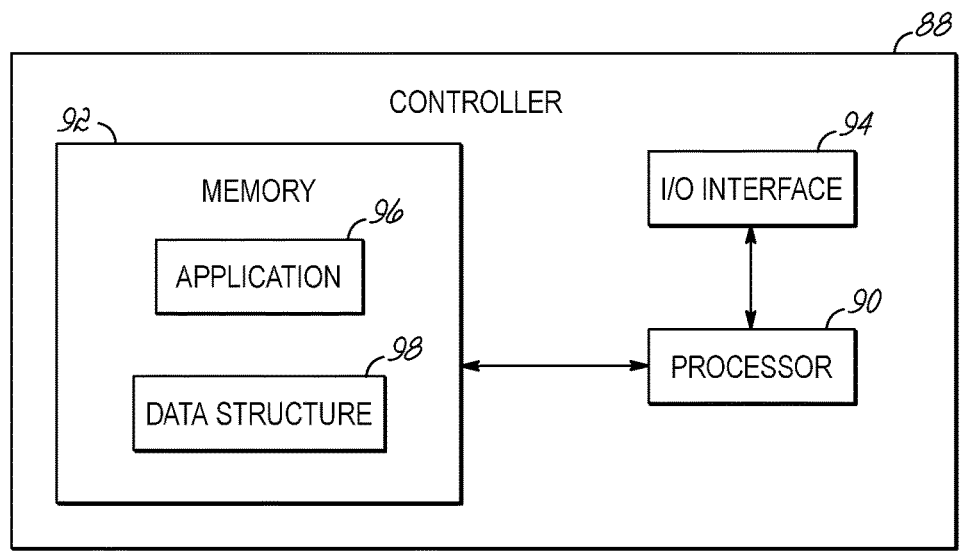
FIG. 7 is a diagrammatic view of a controller that may be used to implement the control system of FIG. 6.

FIG. 7 illustrates an exemplary controller 88 that may be used to provide one or more components of embodiments of the invention, such as the wind turbine controller 82 or supervisory controller 86. The controller 88 may include a processor 90, memory 92, and an input/output (I/O) interface 94. The processor 90 may include one or more devices that perform operations on data based on internal logic or operational instructions that are stored in memory 92. Memory 92 may include a single memory device or a plurality of memory devices capable of storing data. Computer program code embodied as one or more computer software applications, such as an application 96 residing in memory 92, may have instructions executed by the processor 90. One or more data structures 98 may also reside in memory 92, and may be used by the processor 90 or application 96 to store or manipulate data. The I/O interface 94 may provide a machine interface that operatively couples the processor 90 to other devices and systems, such as yaw system 38, wind turbine controller 82, pitch system 84, and supervisory controller 86. The application 96 may thereby work cooperatively with the external devices and systems by communicating via the I/O interface 94 to provide the various features, functions, applications, processes, or modules comprising embodiments of the invention.

Figure 8:
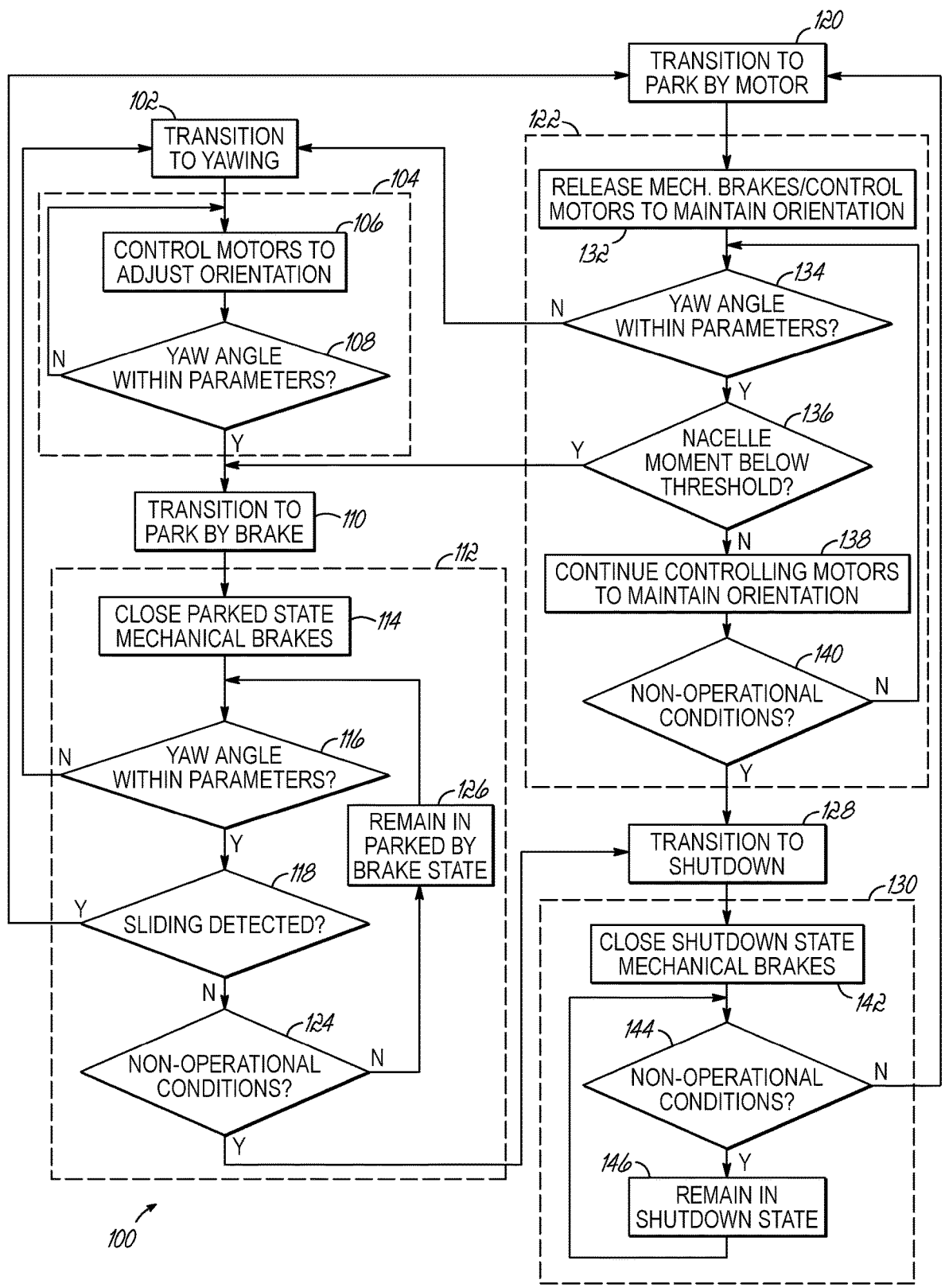
FIG. 8 is a flowchart of a process for controlling the yaw system of FIG. 6.

FIG. 8 illustrates a flowchart depicting an exemplary process 100 that may be implemented to control the yaw system 38 in accordance with the general principles of operation described above. The process 100 may be executed by one or more processors of the yaw system 38, wind turbine controller 82, supervisory controller 86, or any other suitable computing device that controls the wind turbine 10. In block 102, the process 100 may transition from a previous state (e.g., a parked or idle state) to a yawing state 104. In the yawing state 104, the process 100 may proceed to block 106 and control the motors 62 of yaw drives 44 to adjust the orientation of the nacelle 14. This control may include determining one or more of the orientation of the nacelle 14 (e.g., based on signals from a yaw position sensor or encoders in the motors), a direction or speed of the wind (e.g., based on signals from a wind direction/speed sensor), an amount of torque being provided by the yaw drives 44, and a speed of the yaw drives 44.

Once the nacelle orientation and wind conditions are known, the process 100 may determine the yaw angle γ as the angular difference between the nacelle orientation and wind direction. In block 108, the process 100 may determine if the yaw angle γ is within defined parameters, e.g., less than a maximum allowed yaw error. If the yaw angle γ is not within the defined parameters ("NO" branch of decision block 108), the process 100 may return to block 106 and continue controlling the motors 62 to adjust the orientation of the nacelle 14. If the yaw angle γ is within the defined parameters ("YES" branch of decision block 108), the process 100 may proceed to block 110 and transition to a park by brake state 112.

In the park by brake state 112, the process 100 may proceed to block 114 and close a subset of the mechanical brakes 68. The number of mechanical brakes 68 in the parking subset may be that which provides a level of braking friction that, in combination with the inherent friction, allows the nacelle 14 to begin rotating if the nacelle moment exceeds a predefined upper torque threshold. Selecting the number of mechanical brakes 68 in the parking subset to be less than all of the mechanical brakes 68 of the yaw system 38 may provide an upper torque threshold having a value lower than the nacelle moment which would be required to overcome the total braking and friction torque provided by the yaw system 38 when all of the mechanical brakes 68 are closed.

In block 116, the process 100 may determine if the yaw angle γ is still within the defined parameters. If the yaw angle γ is not within the defined parameters ("NO" branch of decision block 116), the process 100 may exit the park by brake state 112 and transition back to the yawing state 104 to adjust the orientation of the nacelle 14. If the yaw angle γ is within the defined parameters ("YES" branch of decision block 116), the process 100 may remain in the park by brake state 112 and proceed to block 118.

In block 118, the process 100 may determine if the closed mechanical brakes 68 are sliding. Sliding may be detected as rotation of the nacelle 14 while the yaw system 38 is in the parked by brake state 112. Rotation of the nacelle 14 may be determined based on signals received from encoders in one or more of the motors 68 or the yaw position sensor. If sliding is detected ("YES" branch of decision block 118), the process 100 may proceed to block 120 and begin transitioning to the parked by motor state 122. If sliding is not detected ("NO" branch of decision block 118), the process 100 may proceed to block 124.

In block 124, the process 100 may determine if the wind turbine 10 is under non-operational conditions. If the wind turbine 10 is not under non-operational conditions ("NO" branch of decision block 124), the process 100 may proceed to block 126 and remain in the park by brake state 112. If the wind turbine 10 is under non-operational conditions ("YES" branch of decision block 124), the process 100 may proceed to block 128 and transition into a shutdown state 130.

In transitioning to the park by motor state 122, the process 100 may proceed to block 132, open one or more (e.g., all) closed mechanical brakes 68, and control the motors 64 of yaw drives 44 to maintain the orientation of the nacelle 14. When transitioning from the parked by brake state to either of the parked by motor or yawing states, one or more of the motors 64 may be activated prior to opening the mechanical brakes 68 to avoid unwanted or sudden movement by the nacelle 14. To smooth the transition into the parked by motor state 122, the process 100 may cause the motors 64 to provide a counter acting torque that opposes the nacelle moment before opening the mechanical brakes 68. The required counter acting torque may be provided in full before opening the mechanical brakes 68, for example, or the motors 64 may be staged to sequentially increase the counter acting torque as closed mechanical brakes 68 are sequentially opened. While in the parked by motor state, the counter acting torque may be provided at a level that maintains the nacelle in its current orientation so long as the nacelle moment remains below a parked by motor torque threshold that is greater than the parked by brake torque threshold. If the nacelle moment exceeds the parked by motor torque threshold, the counter acting torque may be provided at a level that allows controlled sliding. The amount of controlled sliding allowed may be determined based on a controlled sliding curve that defines allowed nacelle sliding as a function of the nacelle moment.

In block 134, the process 100 may determine if the yaw angle γ is within the defined parameters. If the yaw angle γ is not within the defined parameters ("NO" branch of decision block 134), the process 100 may exit the park by motor state 122 and transition back to the yawing state 104 to adjust the orientation of the nacelle 14. If the yaw angle γ is within the allowed parameters ("YES" branch of decision block 134), the process 100 may remain in the park by motor state 122 and proceed to block 136.

In block 136, the process 122 may determine if the nacelle moment is below a lower torque threshold. The lower torque threshold may be defined so that it is less than the upper torque threshold. Setting the lower torque threshold below the upper torque threshold may provide a hysteresis that prevents excessive transitions between the park by brake and park by motor states. The nacelle moment may be determined by the process 100 in the park by motor state 122, for example, based on the amount of counter acting torque the motors 64 must provide to maintain the nacelle 14 in a fixed orientation while the mechanical brakes 68 are open. This counter acting torque may be determined, for example, based on signals from torque sensors in the motor or pinion shafts, an amount of current being provided to the motors 64, or by any other suitable method.

If the nacelle moment is below the lower torque threshold ("YES" branch of decision block 136), the process 100 may proceed to block 110 and transition to the park by brake state 112. If the nacelle moment is not below the lower torque threshold ("NO" branch of decision block 136), the process 100 may proceed to block 138 and continue controlling the motors 64 to maintain the orientation of the nacelle 14. The process 100 may then proceed to block 140 and determine if the wind turbine 10 is under non-operational conditions. If the wind turbine 10 is not under non-operational conditions ("NO" branch of decision block 140), the process 100 may proceed to block 134 and remain in the park by motor state 122. If the wind turbine 10 is under non-operational conditions ("YES" branch of decision block 140), the process 100 may proceed to block 128 and transition into the shutdown state 130.

In alternative embodiments, the process 100 may transition from the parked by motor to the parked by brake state based on something other than (or in addition to) torque thresholds. For example, the process 100 may transition from the parked by motor to the parked by brake state based the rotation of the nacelle or rotation of the yaw drives dropping below a rotational speed threshold, or based on the rotation of the nacelle or rotation of the yaw drives remaining below a rotational speed threshold for more that a predetermined amount of time, e.g., a predetermined number of seconds.

In the shutdown state 130, the process 100 may proceed to block 142 and close a shutdown subset of the mechanical brakes 68. The shutdown subset may include all or only a portion of the mechanical brakes 68 in the yaw system 38 so long as the braking torque provided by the shutdown subset is greater than the braking torque provided by the parking subset of mechanical brakes 68. This greater braking torque may be provided by including more mechanical brakes 68 in the shutdown subset than in the parking subset of mechanical brakes 68. In an alternative embodiment of the invention, the greater braking torque of the shutdown subset may be provided by having one or more mechanical brakes 68 in the shutdown subset that are larger or have greater torque moments than the mechanical brakes 68 in the parking subset.

While in the shutdown state, the process 100 may proceed to block 144 and determine if the wind turbine 10 is under non-operational conditions. If the wind turbine 10 is not under non-operational conditions ("NO" branch of decision block 144), the process 100 may proceed to block 120 (or any other suitable block for restarting operation of the wind turbine 10) and transition into the parked by motor state 122. If the wind turbine 10 is still under non-operational conditions ("YES" branch of decision block 140), the process 100 may proceed to block 146 and remain in the shutdown state 130.

It should be understood that the flowchart for process 100 is exemplary only, and that the various states and subprocesses may occur in a different order, or may be operated on an interrupt driven basis. For example, the process 100 may be configured to transition to certain states at any time (e.g., shutdown or yawing states) in response to an interrupt triggered by an event, such as the occurrence of a non-operational condition or the yaw angle γ exceeding defined parameters.

The advantages of configuring the yaw system 38 to operate with one or more open mechanical brakes 68 under operational conditions may include the ability to adjust the level of braking torque based on operational parameters, e.g., using a predefined algorithm or through manual adjustment during operation. This could allow the yaw system controller to implement different levels of braking torque based on the number of nacelles 14 or rotors 16 of a multi-rotor system that are in operation.

Additional features that could be implemented may include selecting which mechanical brakes 68 are included in the parking subset based on the number of times the mechanical brake 68 has been used to brake the nacelle 14, e.g., transitioned from the open to the closed state. For example, the yaw system controller could periodically determine which mechanical brake 68 in the parking subset had been through the most transitions between the open and closed states, and swap that mechanical brake 68 with the mechanical brake 68 outside the parking subset having the fewest transitions between the open and closed states. The number of transitions may be for a predefined period of time, such as over a previous number of minutes or hours, or since a predetermined point in time, e.g., the last maintenance inspection. This would allow mechanical brakes 68 to be rotated in and out of the parking subset to even out the amount of wear on the electrical components and the brakes by varying the "pattern" of mechanical brakes 68 in the parking subset. In an alternative embodiment, the mechanical brakes could be selected based on an estimated or measured accumulated fatigue load in each yaw drive, or based on an accumulated time each mechanical brake has been in the closed state.

A minimum delay time before switching a mechanical brake 68 between open and closed states could also be implemented to force the yaw system 38 to select a less-recently used mechanical brake 68 for a state change when changing the amount of braking torque. The delay time could thereby avoid rapid switching between open and closed states in a single mechanical brake 68, as well as spread braking operations out among the plurality of mechanical brakes 68. The parking subset of mechanical brakes could also be defined by ranking the mechanical brakes 68 in order from least recently used to most recently used, and selecting the predetermined number of mechanical brakes 68 that were least recently used as the parking subset of mechanical brakes 68.

In an alternative embodiment of the invention, multiple brake levels may be achieved by including multiple mechanical brakes 68 (e.g., two mechanical brakes 68) in series in each yaw driver 44. In this embodiment, one mechanical brake 68 may be closed and used to detect sliding while the yaw system 38 is in the parked by brake state 112, and the other (optionally larger) mechanical brake 68 (or both mechanical brakes 68) closed to provide a high amount of braking torque under non-operational conditions.

Figure 9:
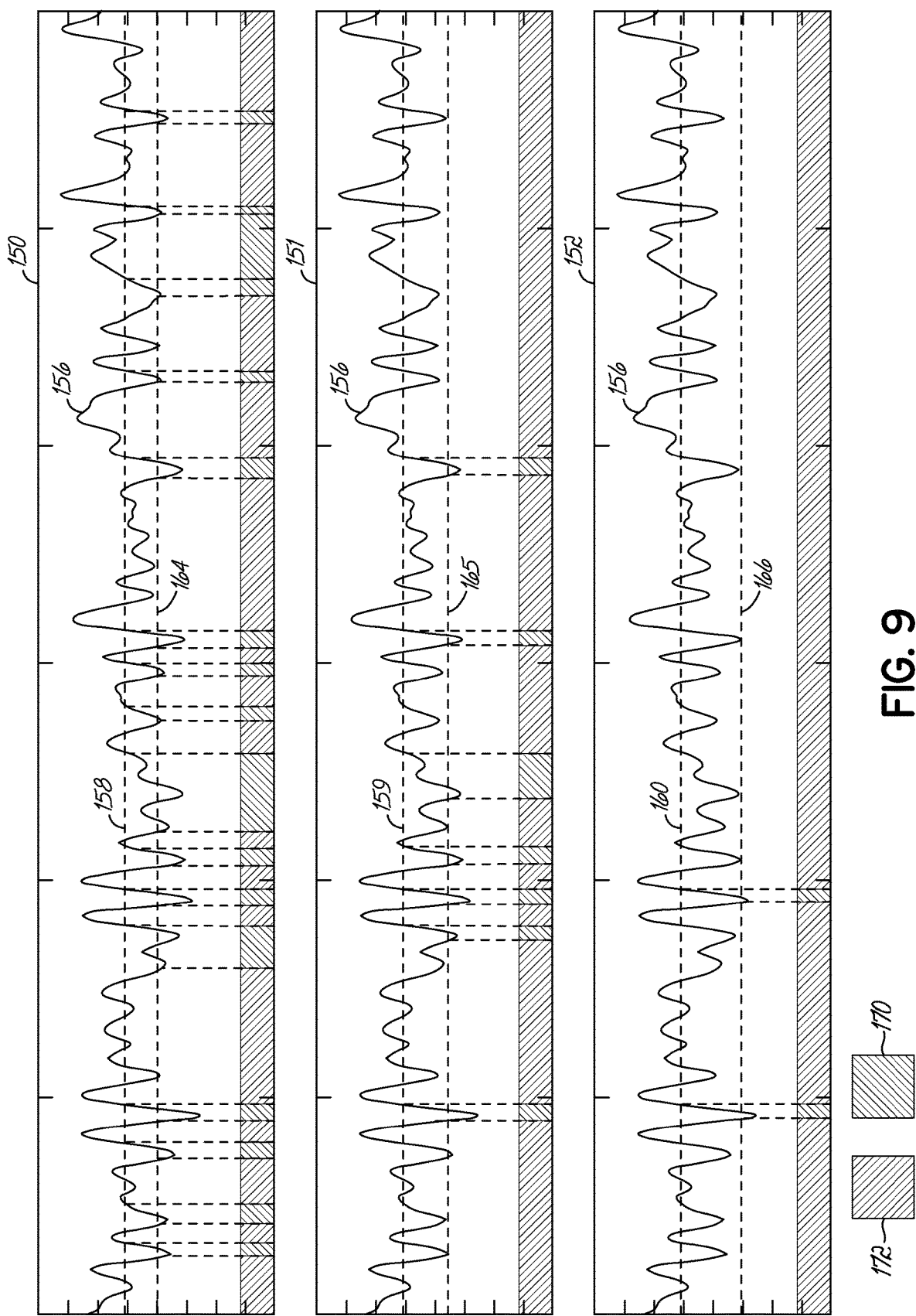
FIG. 9 is a graphical view showing the effects of adjusting torque thresholds on the number of state transitions in the process of FIG. 8.

FIG. 9 depicts a series of graphs 150-152 each including an exemplary plot 156 of a nacelle moment verses time for the wind turbine 10. In each graph 150-152, an upper dashed line 158-160 may represent the upper torque threshold for the nacelle moment, and a lower dashed line 164-166 may represent the lower torque threshold for the nacelle moment. A horizontal bar at the bottom of each graph includes cross-hatched areas indicating when the yaw system 38 is in the parked by brake state 170 and the parked by motor state 172. Each time the plot 156 crosses above the upper dashed line 158-160 while the wind turbine 10 is in the parked by brake state 170, the yaw system 38 transitions from the parked by brake state 170 to the parked by motor state 172. Conversely, each time the plot 156 crosses below the lower dashed line 164-166 while the wind turbine 10 is in the parked by motor state 172, the yaw system 38 transitions to the parked by brake state 170. Each transition from one state to the another is indicated by a vertical dashed line.

The vertical separation between each upper dashed line 158-160 and its respective lower dashed line 164-166 provides a visual indication of an amount of torque hysteresis built into the yaw system 38. Graph 150 depicts the behaviour of a yaw system 38 with a relatively low amount of hysteresis that results in 30 transitions. As shown by graph 151, increasing the hysteresis by about 50% lowers the number of transitions to 14. As shown by graph 152, increasing the hysteresis by about 100% as compared to graph 150 further reduces the number of transitions to four. Thus, the number of transitions between parking states can be reduced by increasing the hysteresis, e.g., by lowering the lower torque threshold. Similar results may occur if the hysteresis is increased by raising the upper torque threshold, or both raising the upper torque threshold and lowering the lower torque threshold. Hence, both the number of transitions between states and the ratio of time spent in the parked by brake state to time spent in the parked by motor state can be controlled by adjusting the positions of the upper and lower torque thresholds.

The upper torque threshold may be raised by adding mechanical brakes to the parking subset of mechanical brakes, and lowered by removing mechanical brakes from the parking subset of mechanical brakes. Added mechanical brakes would be taken from the subset of brakes that are kept open while in the parked by brake mode, and removed mechanical brakes would be added to the subset of brakes that are kept open while in the parked by brake mode. Typically, the upper torque threshold will be determined by the specifications for other systems in the wind turbine 10, such as tower design loads. The lower torque threshold may be adjusted by changing the torque threshold setting in the yaw system controller. Adjustment criteria could include, for example, a rule that no more than a predetermined number of activations should occur within a predetermined amount of time. This may be determined by counting transitions over a rolling period (e.g., the previous hour), and changing one or more of the torque thresholds if the number of transitions exceeds an upper transition frequency threshold (e.g., to increase the torque hysteresis), or are below a lower transition frequency threshold (e.g., to reduce the torque hysteresis).

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention. Computer-readable storage media, which is inherently non-transitory, may include volatile and non-volatile, and removable and non-removable tangible media implemented in any method or technology for storage of data.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A system for controlling a wind turbine that includes a tower and a nacelle, the system comprising:
   a yaw drive configured to selectively apply torque between the tower and the nacelle;
   a plurality of mechanical brakes that, when each of the mechanical brakes is in a closed state, provides a first amount of braking torque between the tower and the nacelle;
   one or more processors operatively coupled to the yaw drive and the plurality of mechanical brakes; and
   a memory coupled to the one or more processors and including program code that, when executed by the one or more processors, causes the system, under operational conditions, to:
      while in a yawing state, activate the yaw drive to rotate the nacelle to a first orientation relative to the tower;
      in response to the nacelle reaching the first orientation, transition from the yawing state to a parked by brake state in which the yaw drive is inactive, each mechanical brake of a first subset of the plurality of mechanical brakes is in an open state, and each mechanical brake of a second subset of the plurality of mechanical brakes is in the closed state, wherein the second subset of the plurality mechanical brakes provides a second amount of braking torque between the tower and the nacelle that is less than the first amount of braking torque;
      in response to detecting a rotation of the nacelle while in the parked by brake state, transition from the parked by brake state to a parked by motor state in which the yaw drive is activated to provide a counter acting torque in opposition to the detected rotation of the nacelle;
      cause transition between the parked by brake state and the parked by motor state during a period of time, wherein transition from the parked by motor state to the parked by brake state occurs each instance an amount of the counter acting torque being provided in opposition to the detected rotation of the nacelle while in the parked by motor state drops below a first torque threshold that is below the second amount of braking torque; and
      change the first torque threshold or a number of mechanical brakes in the second subset of the plurality of mechanical brakes, or both, based on the number of times the system has transitioned between the parked by brake state and the parked by motor state during the period of time.

2. The system of claim 1, wherein the program code further causes the system to:
   in response to the number of times being above a first transition frequency threshold, decrease the first torque threshold; and
   in response to the number of times being below a second transition frequency threshold that is less than the first transition frequency threshold, increase the first torque threshold.

3. The system of claim 1, wherein the program code further causes the system to:
   in response to the number of times being above a first transition frequency threshold, increase the number of mechanical brakes in the second subset of the plurality of mechanical brakes; and in response to the number of times being below a second transition frequency threshold that is less than the first transition frequency threshold, decrease the number of mechanical brakes in the second subset of the plurality of mechanical brakes.

4. The system of claim 1, wherein the program code further causes the system to:
select which mechanical brakes are included in the second subset of the plurality of mechanical brakes based on a number of times each mechanical brake has transitioned between the open state and the closed state.

5. The system of claim 1, wherein the program code further causes the system to:
in response to being under non-operational conditions, cause each of the plurality of mechanical brakes to enter the closed state so the plurality of mechanical brakes provides the first amount of braking torque between the tower and the nacelle.

6. The system of claim 5, wherein the non-operational conditions include one or more of a wind speed exceeding a cut-out speed, a loss of grid power, and a system fault.

7. The system of claim 1, wherein each mechanical brake of the plurality of mechanical brakes is configured to be normally closed.

8. The system of claim 1, wherein the program code further causes the system to, in response to the yaw drive being activated to provide the counter acting torque in opposition to the detected rotation of the nacelle, open each mechanical brake of the second subset of the plurality of mechanical brakes.

9. The system of claim 1, wherein the counter acting torque in opposition to the detected rotation of the nacelle is provided at a first level that maintains the nacelle in the first orientation while a nacelle moment is below a second torque threshold, and is provided at a second level that allows the nacelle to slide in a controlled manner when the nacelle moment is above the second torque threshold, wherein the second torque threshold is above the second amount of braking torque.

10. A method of controlling a wind turbine that includes a tower, a nacelle, a yaw drive, and a plurality of mechanical brakes, the method comprising:
while the wind turbine is in a yawing state, activating the yaw drive to rotate the nacelle to a first orientation relative to the tower;
in response to the nacelle reaching the first orientation, transitioning the wind turbine from the yawing state to a parked by brake state in which the yaw drive is inactive, each mechanical brake of a first subset of the plurality of mechanical brakes is in an open state, and each mechanical brake of a second subset of the plurality of mechanical brakes is in a closed state, wherein a first amount of braking torque is provided between the tower and the nacelle when each of the plurality of mechanical brakes is in the closed state, and a second amount of braking torque is provided between the tower and the nacelle that is less than the first amount of braking torque when only the second subset of the plurality mechanical brakes is in the closed state;
in response to detecting a rotation of the nacelle while in the parked by brake state, transitioning the wind turbine from the parked by brake state to a parked by motor state in which the yaw drive is activated to provide a counter acting torque in opposition to the detected rotation of the nacelle;
transitioning the wind turbine between the parked by brake state and the parked by motor state during a period of time, wherein transitioning the wind turbine from the parked by motor state to the parked by brake state occurs each instance an amount of the counter acting torque being provided in opposition to the detected rotation of the nacelle while in the parked by motor state drops below a torque threshold that is below the second amount of braking torque; and
changing the torque threshold based on a number of times the wind turbine has transitioned between the parked by brake state and the parked by motor state during the period of time.

11. The method of claim 10, further comprising:
in response to the number of times being above a first transition frequency threshold, decreasing the torque threshold; and
in response to the number of times being below a second transition frequency threshold that is less than the first transition frequency threshold, increasing the torque threshold.

12. The method of claim 10, further comprising:
in response to the number of times being above a first transition frequency threshold, increasing the number of mechanical brakes in the second subset of the plurality of mechanical brakes; and
in response to the number of times being below a second transition frequency threshold that is less than the first transition frequency threshold, decreasing the number of mechanical brakes in the second subset of the plurality of mechanical brakes.

13. A computer program product for controlling a wind turbine that includes a tower, a nacelle, a yaw drive, and a plurality of mechanical brakes, the computer program product comprising:
a non-transitory computer-readable storage medium; and
program code stored on the non-transitory computer-readable storage medium that, when executed by one or more processors, causes the one or more processors to:
while the wind turbine is in a yawing state, activate the yaw drive to rotate the nacelle to a first orientation relative to the tower;
in response to the nacelle reaching the first orientation, transition the wind turbine from the yawing state to a parked by brake state in which the yaw drive is inactive, each mechanical brake of a first subset of the plurality of mechanical brakes is in an open state, and each mechanical brake of a second subset of the plurality of mechanical brakes is in a closed state, wherein a first amount of braking torque is provided between the tower and the nacelle when each of the plurality of mechanical brakes is in the closed state, and a second amount of braking torque is provided between the tower and the nacelle that is less than the first amount of braking torque when only the second subset of the plurality mechanical brakes is in the closed state;
in response to detecting a rotation of the nacelle while in the parked by brake state, transition the wind turbine from the parked by brake state to a parked by motor state in which the yaw drive is activated to provide a counter acting torque in opposition to the detected rotation of the nacelle; and
transition the wind turbine between the parked by brake state and the parked by motor state during a period of time; and
change a number of mechanical brakes in the second subset of the plurality of mechanical brakes based on a number of times the wind turbine has transitioned between the parked by brake state and the parked by motor state during the period of time.

14. The computer program product of claim 13, wherein, when executed, the program code further causes the one or more processors to:
   detect an amount of the counter acting torque being provided in opposition to the detected rotation of the nacelle while in the parked by motor state; and
   in response to each instance that the counter acting torque drops below a first torque threshold that is below the second amount of braking torque, transition the wind turbine from the parked by motor state to the parked by brake state.

15. The computer program product of claim 14, wherein, when executed, the program code further causes the one or more processors to:
   determine the number of times the wind turbine has transitioned between the parked by brake state and the parked by motor state during the period of time;
   in response to the number of times being above a first transition frequency threshold, decrease the first torque threshold; and
   in response to the number of times being below a second transition frequency threshold that is less than the first transition frequency threshold, increase the first torque threshold.

16. The computer program product of claim 13, wherein, when executed, the program code further causes the one or more processors to:
   determine the number of times the wind turbine has transitioned between the parked by brake state and the parked by motor state during the period of time;
   in response to the number of times being above a first transition frequency threshold, increase the number of mechanical brakes in the second subset of the plurality of mechanical brakes; and
   in response to the number of times being below a second transition frequency threshold that is less than the first transition frequency threshold, decrease the number of mechanical brakes in the second subset of the plurality of mechanical brakes.

* * * * *